(12) United States Patent
Ansari et al.

(10) Patent No.: US 11,007,887 B2
(45) Date of Patent: May 18, 2021

(54) TUBULAR INDUCTION COIL FOR WIRELESS CHARGING OF A VEHICLE BATTERY

(71) Applicant: Lear Corporation, Southfield, MI (US)

(72) Inventors: Ajmal Imran Ansari, Canton, MI (US); William J. Hayes, Hendersonville, NC (US); Randall Todd Sinnaeve

(73) Assignee: LEAR CORPORATION, Southfield, MI (US)

( * ) Notice: Subject to any disclaimer, the term of this patent is extended or adjusted under 35 U.S.C. 154(b) by 83 days.

(21) Appl. No.: 16/508,511

(22) Filed: Jul. 11, 2019

(65) Prior Publication Data
US 2021/0008988 A1    Jan. 14, 2021

(51) Int. Cl.
| | |
|---|---|
| *B60L 53/12* | (2019.01) |
| *B60L 53/302* | (2019.01) |
| *H02J 7/02* | (2016.01) |
| *H02J 50/10* | (2016.01) |
| *H02J 7/00* | (2006.01) |

(52) U.S. Cl.
CPC ............ *B60L 53/12* (2019.02); *B60L 53/302* (2019.02); *H02J 7/00* (2013.01); *H02J 7/025* (2013.01); *H02J 50/10* (2016.02)

(58) Field of Classification Search
CPC ........ B60L 53/12; B60L 53/302; H02J 50/10; H02J 7/00; H02J 7/025
USPC .......................................................... 307/104
See application file for complete search history.

(56) References Cited

U.S. PATENT DOCUMENTS

| | | |
|---|---|---|
| 5,461,215 A | 10/1995 | Haldeman |
| 6,376,978 B1 | 4/2002 | Leung et al. |
| 6,531,942 B2 | 3/2003 | Moncrieff et al. |
| 6,683,510 B1 | 1/2004 | Padilla |
| 6,789,305 B2 | 9/2004 | Seki et al. |

(Continued)

FOREIGN PATENT DOCUMENTS

WO    2015077782 A1    5/2015

OTHER PUBLICATIONS

Yu, Xuehong et al., Watt-Level Wireless Power Transfer Based on Stacked Flex Circuit Technology, Conference Paper in Proceedings—Electronic Components and Technology Conference, Jul. 2011, pp. 2185-2191, 10.1109/ECTC.2011.5898822—Source: IEEE Xplore.

*Primary Examiner* — Hal Kaplan
(74) *Attorney, Agent, or Firm* — Brooks Kushman P.C.

(57) ABSTRACT

An induction coil for wireless charging of a vehicle battery is described. The induction coil includes an electrically conductive tube configured as multiple windings, and an electrically conductive coupler configured for attachment to the electrically conductive tube. The electrically conductive tube and the electrically conductive coupler are adapted to conduct an alternating current. Alternating current flow in the tube and the plurality of windings generates a magnetic field for wireless inductive charging of the vehicle battery. The electrically conductive tube and the electrically conductive coupler are each configured for passage of a coolant therethrough. A coolant flow through the electrically conductive tube transfers heat from the electrically conductive tube generated by alternating current flow through the electrically conductive tube.

20 Claims, 4 Drawing Sheets

(56) References Cited

U.S. PATENT DOCUMENTS

| | | |
|---|---|---|
| 8,610,530 B2 | 12/2013 | Singh et al. |
| 10,193,400 B2 | 1/2019 | Long et al. |
| 2011/0102125 A1 | 5/2011 | Tamura et al. |
| 2014/0021794 A1 | 1/2014 | Kim et al. |
| 2015/0244203 A1 | 8/2015 | Kurz et al. |
| 2015/0340153 A1 | 11/2015 | Lohr et al. |
| 2017/0063132 A1* | 3/2017 | Sultenfuss .............. H02J 7/025 |
| 2017/0213644 A1 | 7/2017 | Lee et al. |
| 2017/0222472 A1 | 8/2017 | Lee et al. |
| 2017/0228721 A1 | 8/2017 | Lee et al. |
| 2017/0338023 A1 | 11/2017 | Ansari et al. |
| 2018/0211773 A1 | 7/2018 | Krammer |
| 2021/0012956 A1 | 1/2021 | Ansari et al. |

* cited by examiner

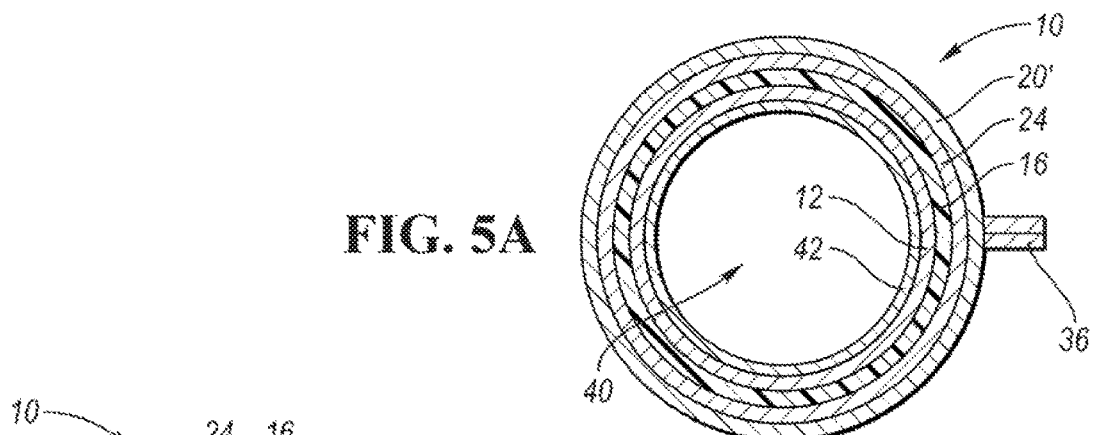

FIG. 5A

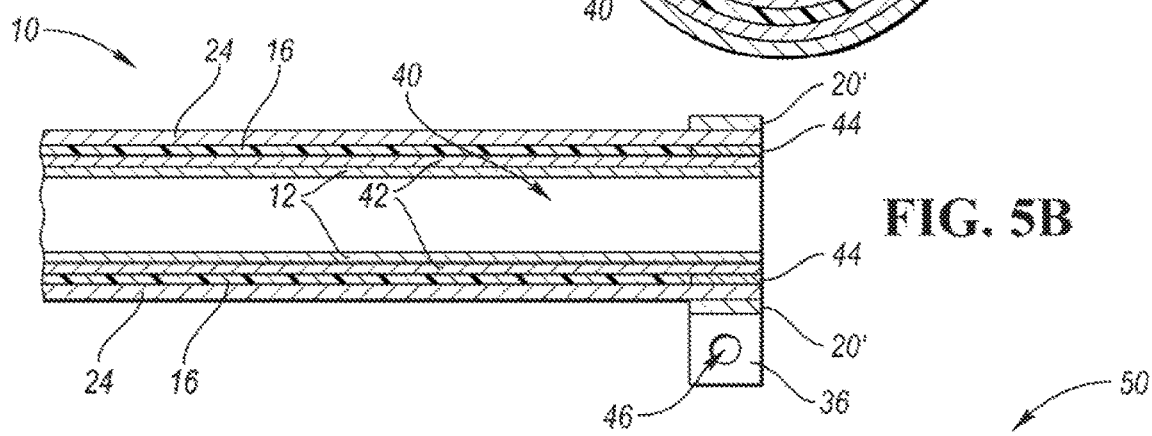

FIG. 5B

```
┌─────────────────────────────────────────────────────────────────┐
│ Forming a First Electrically Conductive Tube, a Second          │
│ Electrically Conductive Tube, and an Electrically Insulative    │ 52
│ Material into a Concentric Tube Structure, Wherein the          │
│ Electrically Insulative Material is Between the First and       │
│ Second Electrically Conductive Tubes and Electrically Isolates  │
│ the First Electrically Conductive Tube from the Second          │
│ Electrically Conductive Tube.                                   │
└─────────────────────────────────────────────────────────────────┘
                                │
                                ▼
┌─────────────────────────────────────────────────────────────────┐
│ Bending the Concentric Tube Structure to Form a Plurality of    │
│ Windings, Wherein Alternating Current Flow in the Plurality of  │ 54
│ Windings Generates a Magnetic Field for Wireless Inductive      │
│ Charging of the Vehicle Battery, and Wherein the Concentric     │
│ Tube Structure is Configured for Passage of a Coolant           │
│ Therethrough to Transfer Heat Generated by Alternating Current  │
│ Flow in the Second Electrically Conductive Tube.                │
└─────────────────────────────────────────────────────────────────┘
                                │
                                ▼
┌─────────────────────────────────────────────────────────────────┐
│ Attaching an Electrically Conductive Coupler to the             │ 56
│ Concentric Tube Structure, the Electrically Conductive Coupler  │
│ Comprising an Attachment Feature for Attachment to an           │
│ Electrical Conductor.                                           │
└─────────────────────────────────────────────────────────────────┘
```

FIG. 6

TUBULAR INDUCTION COIL FOR WIRELESS CHARGING OF A VEHICLE BATTERY

TECHNICAL FIELD

The following relates to a tubular induction coil for wireless charging of a vehicle battery.

BACKGROUND

Current wireless chargers for charging traction batteries in electric vehicles, such as hybrid and plug-in hybrid vehicles, utilize a Litz wire. The Litz wire used in traction battery charging consists of large number of strands (e.g., 1000-2000) of fine diameter (e.g., AWG 36-42) magnetic wires. The individual strands are woven in small bundles and multiple bundles are woven together in a precise pattern to form the Litz wire. To retain the shape of the Litz wire, the woven bundles are wrapped by polymer thread called a serve. The serve helps to electrically insulate the Litz wire and also helps in mechanically retaining the cross-sectional shape of the Litz wire.

Due to the fine strand diameter and the serve, Litz wire is easy to bend. However, induction coils made from Litz wire for wireless charging of electric vehicle traction batteries cannot be pre-fabricated. Instead, to make induction coils for wireless charging of electric vehicle traction batteries, Litz wire are wound, either manually or with the aid of simply rotary table, directly on a coil former of a pad. The pad may be a base pad for use in a charging station, or a vehicle pad adapted or configured to be mounted in a vehicle such that the vehicle induction coil may cooperate with a charging station induction coil for wireless charging of the electric vehicle traction batteries. Litz wire based vehicle pad and base pad induction coils thus require labor intensive assembly that is expensive and less repeatable.

For these and other reasons, Litz wire is a high cost product. Moreover, due to the fine strands and serve described above, Litz wire is also inherently prone to damage during assembly. Vehicle pad packaging constraints require sharp bends in the induction coil and the insulation on individual strands of wire insulation consequently undergoes high mechanical strain. In conjunction with such high mechanical strain, thermal cycling during normal usage of the induction coil reduces the life of the Litz wire. In that regard, even though the copper used in Litz wire has excellent thermal conductivity, the air gaps within the wire bundles create conditions that prevent heat from efficiently escaping from the core of the Litz wire. Still further, Litz wire based systems become prohibitively large for high power transfer induction coils.

A need therefore exists for an improved induction coil and an improved method of manufacturing an induction coil for wireless charging of traction batteries in electric vehicles that overcomes the problems described above associated with current Litz wire based induction coils. Such an improved induction coil for wireless charging of electric vehicle traction batteries may comprise a tubular structure made from an electrically conductive material. Such an improved induction coil may be made by bending the tubular structures. The outside surface of the tubular structure of such an improved induction coil may be provided with an electrically insulating material. In such an improved induction coil, for higher current and charging power, multiple parallel and/or concentric tubular structures may be used. Such an improved induction coil may also be cooled via a coolant passing through the inner surfaces of the tubular structure.

SUMMARY

According to one non-limiting exemplary embodiment described herein, an induction coil is provided for wireless charging of a vehicle battery. The induction coil comprises an electrically conductive tube configured as a plurality of windings, and an electrically conductive coupler configured for attachment to the electrically conductive tube. The electrically conductive tube and the electrically conductive coupler are adapted to conduct an alternating current, wherein alternating current flow in the tube and the plurality of windings generates a magnetic field for wireless inductive charging of the vehicle battery. The electrically conductive tube and the electrically conductive coupler are each configured for passage of a coolant therethrough, wherein a coolant flow through the electrically conductive tube transfers heat from the electrically conductive tube generated by alternating current flow in the electrically conductive tube.

According to another non-limiting exemplary embodiment described herein, an induction coil is provided for wireless charging of a vehicle battery. The induction coil comprises a first electrically conductive tube, and a second electrically conductive tube inside the first electrically conductive tube and coextensive therewith, wherein the first and second electrically conductive tubes are configured as a plurality of windings. The induction coil further comprises a first electrically insulative material between the first and second electrically conductive tubes, and an electrically conductive coupler configured for attachment to the first electrically conductive tube, wherein the electrically conductive coupler comprises an attachment feature for attachment to an electrical conductor. The first and second electrically conductive tubes and the electrically conductive coupler are adapted to conduct an alternating current, wherein alternating current flow in the first and second electrically conductive tubes and the plurality of windings generates a magnetic field for wireless inductive charging of the vehicle battery. The second electrically conductive tube is configured for passage of a coolant therethrough, wherein a coolant flow through the second electrically conductive tube transfers heat from at least the second electrically conductive tube generated by alternating current flow in the second electrically conductive tube.

According to another non-limiting exemplary embodiment described herein, a method of manufacturing an induction coil for wireless charging of a vehicle battery is described. The method comprises forming a first electrically conductive tube, a second electrically conductive tube, and an electrically insulative material into a concentric tube structure, wherein the second electrically conductive tube is inside the first electrically conductive tube, and wherein the first electrically insulative material is between the first and second electrically conductive tubes and electrically isolates the first electrically conductive tube from the second electrically conductive tube. The method further comprises bending the concentric tube structure to form a plurality of windings, wherein the first and second electrically conductive tubes are adapted to conduct an alternating current, wherein alternating current flow in the first and second electrically conductive tubes and the plurality of windings generates a magnetic field for wireless inductive charging of the vehicle battery, wherein the concentric tube structure is configured for passage of a coolant therethrough, and wherein a coolant flow through the tube structure transfers heat from at least the second electrically conductive tube generated by alternating current flow in the second electrically conductive tube.

A detailed description of these and other non-limiting exemplary embodiments of an induction coil and a method for manufacturing an induction coil for wireless charging of a vehicle battery is set forth below together with the accompanying drawings.

BRIEF DESCRIPTION OF THE DRAWINGS

FIG. 5A is a cross-sectional view of an induction coil for wireless charging of a vehicle battery and an electrically conductive coupler according to another non-limiting exemplary embodiment of the present disclosure;

FIG. 5B a cross-sectional view of an induction coil for wireless charging of a vehicle battery and an electrically conductive coupler according to another non-limiting exemplary embodiment of the present disclosure; and FIG. 6 is a flowchart of a method of manufacturing an induction coil for wireless charging of a vehicle battery according to another non-limiting exemplary embodiment of the present disclosure.

DETAILED DESCRIPTION

Figure 1A:
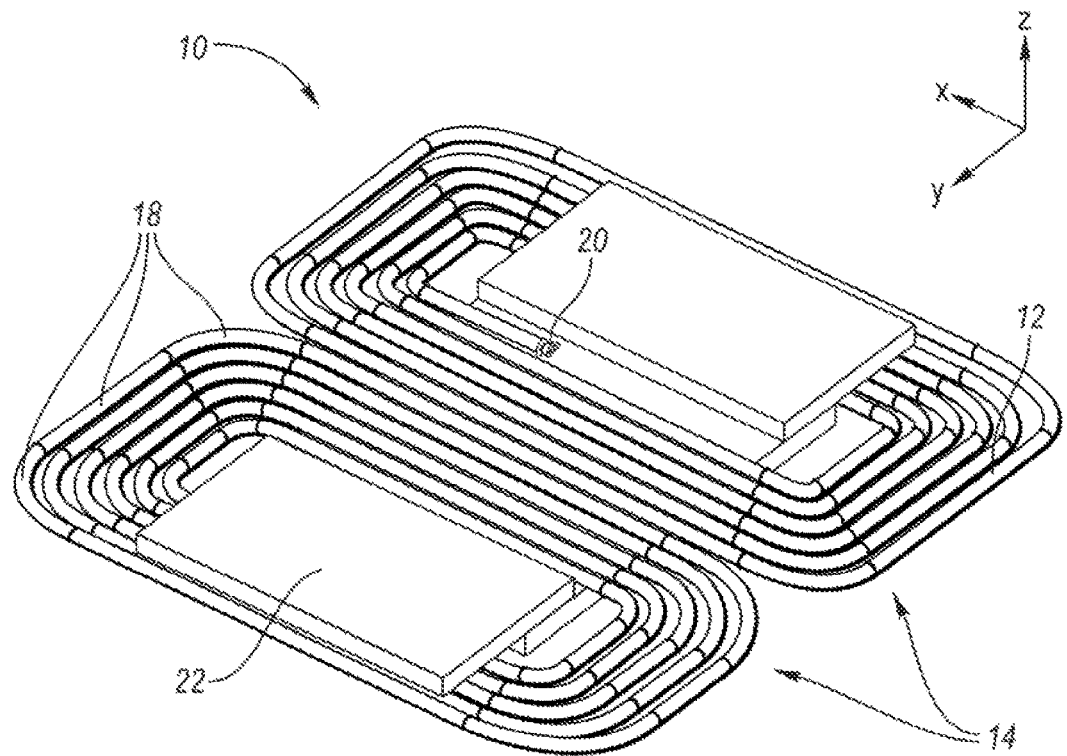
FIG. 1A is a perspective view illustrating an induction coil for wireless charging of a vehicle battery according to one non-limiting exemplary embodiment of the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

As previously described, Litz wire based induction coils for wireless charging of traction batteries of electric vehicles have a number of problems associated therewith. The present disclosure describes an improved induction coil and an improved method of manufacturing an induction coil for wireless charging of electric vehicle traction batteries that overcomes such problems.

In general, the present disclosure describes an improved induction coil and an improved method of manufacturing an induction coil for wireless charging of electric vehicle traction batteries that may comprise a tubular structure made from an electrically conductive material. The induction coil may be made by extruding and/or bending the tubular structures. The outside surface of the tubular structure may be provided with an electrically insulating material, which may comprise a layer of varnish, paint, or oxide, or a polymer formed or configured as a tape on a surface of or as a tube around the electrically conductive tubular structure. For higher current and charging power, multiple parallel and/or concentric tubular structures may be used. The induction coil may be cooled via a coolant passing through the inner region of the tubular structure. To electrically isolate possibly electrically conductive coolant from the electrically conductive tubular structure, the inner surface of the tubular structure may be provided with an electrically insulating coating typically made of varnish, enamel, oxide or a film of polymer coating.

By using coolant to internally remove heat generated by Joule heating in the induction coil and hysteresis losses in ferrites adjacent to the induction coil, the induction coil of the present disclosure combines the function of heat exchanger and a battery charging induction coil. In that regard, the purpose of the coil is to form a magnetic field appropriate for power transfer between a pair of coils, often called primary and secondary coils. The primary coil generates the magnetic field that is captured by the secondary coil. To help shape the magnetic field so that the magnetic field intensity at various spatial locations has a magnitude that promotes efficient power transfer, ferrite tiles are placed adjacent to the coils. The ferrite tiles provide a path of low resistance to magnetic flux and help in integrating the magnetic flux produced by individual turns of the coils. Due to alternating current passing in or through the coils, the magnetic field also changes its direction and due to hysteresis, causes losses in the adjacent ferrites.

The induction coil of the present disclosure may also include an end plug or coupler that allows for an electrical connection to be made to the induction coil while also allowing coolant to flow in and out of the coil. In contrast to Litz wire based induction coils, the induction coil design of the present disclosure is also physically smaller and lighter at high power levels.

For comparable performance, an induction coil having a tubular structure as described in the present disclosure is lower in cost than a Litz wire based induction coil. Tubular induction coils can also be manufactured from aluminum, thereby further reducing cost. Moreover, as described previously, induction coils made from Litz wire for wireless charging of electric vehicle traction batteries are wound, either manually or with the aid of simply rotary table, directly on a coil former of a base pad or vehicle pad. Litz wire based induction coils therefore cannot be pre-fabricated and require labor intensive assembly that is expensive and less repeatable. In contrast, an induction coil comprising a tubular structure as described in the present disclosure can be pre-fabricated and dropped in a vehicle pad or base pad during the assembly process. Design of the base pad and vehicle pad induction coil carrier thereby becomes substantially simpler and lower in cost. In that regard, because the tubular structure of the present disclosure uses structurally stiff metallic tubes, unlike the Litz wire based coil designs, the tubular structure of the present disclosure does not require a part referred to as a coil former whose function is to locate Litz wire in the desired coil pattern and to provide support to the Litz wire. That is, the tubular structure of the present disclosure eliminates the coil former.

An induction coil comprising a tubular structure as described in the present disclosure also has improved reliability relative to a Litz wire based induction coil. As described previously, due to its fine wire strands and serve, Litz wire is inherently prone to damage during assembly. In that regard, vehicle pad packaging constraints require sharp bends in a Litz wire induction coil and the insulation on individual strands of wire insulation consequently undergoes high mechanical strain. Moreover, thermal cycling during normal usage of a Litz wire induction coil in conjunction with such high mechanical strain reduces the life of the Litz wire. In that regard, even though the copper used in Litz wire has excellent thermal conductivity, the air gaps within the wire bundles create conditions that prevent heat from efficiently escaping from the core of the Litz wire. Even if an active cooling system were to be designed for Litz wire based induction coils, its implementation would be expensive and thermally less efficient.

In contrast, an induction coil comprising a tubular structure as described in the present disclosure is mechanically rugged. Moreover, the tubular structure of such an induction coil allows for a coolant to be passed through the induction coil to improve cooling thereof. With such internal cooling of the coil, the coil acts as a heat sink and keeps the temperature of the previously described ferrite more uniform and significantly reduces the risk of ferrite cracking. In that same regard, Litz wire based systems become prohibitively large for high power transfer induction coils, while the internal cooling of the induction coil described in the present disclosure allows compact designs even for very high power transfer levels.

With reference to FIGS. 1A-4B, a more detailed description of non-limiting exemplary embodiments of an induction coil for wireless charging of a vehicle battery will be provided. For ease of illustration and to facilitate understanding, like reference numerals have been used herein for like components and features throughout the drawings.

Figure 1B:
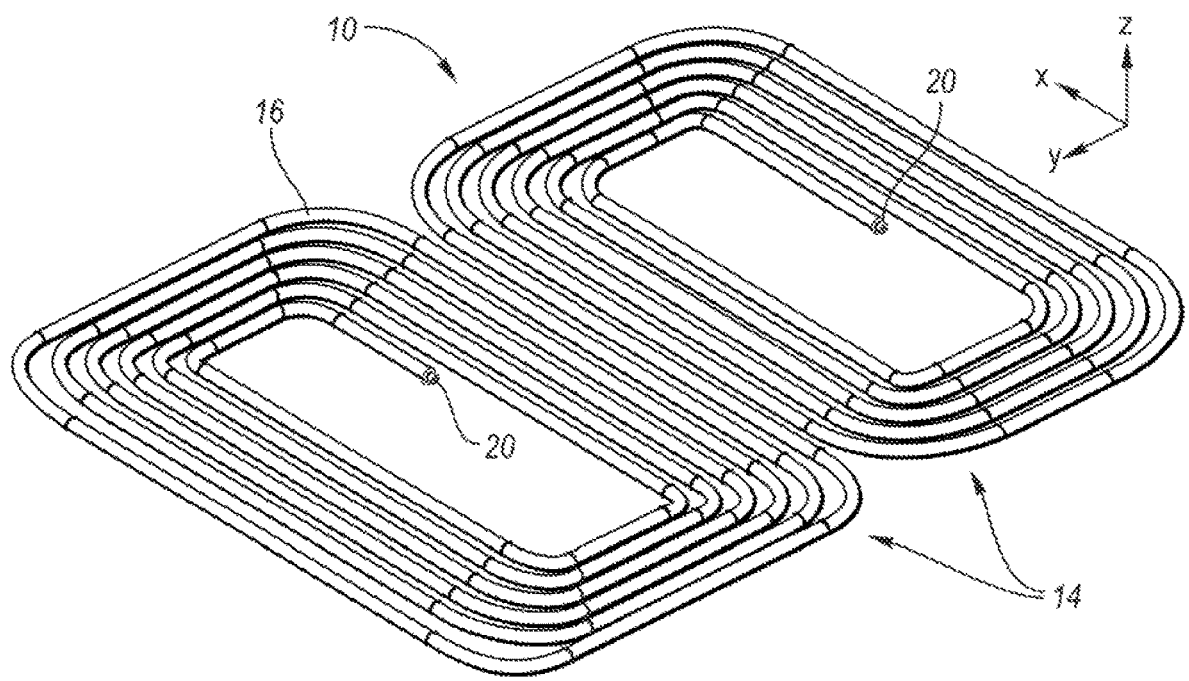
FIG. 1B is a perspective view illustrating an induction coil for wireless charging of a vehicle battery according to another non-limiting exemplary embodiment of the present disclosure.

In that regard, FIGS. 1A and 1B illustrate perspective views of an induction coil 10 for wireless charging of a vehicle battery (not shown) according to non-limiting exemplary embodiments of the present disclosure. As seen in FIG. 1A, the induction coil 10 may comprise an electrically conductive tube 12 which may be fabricated, configured and/or formed as or into a plurality of coils, turns, or windings 14. As seen in FIG. 1B, an electrically insulative material 16 may be provided on an outer surface of the electrically conductive tube 12. In that regard, the electrically insulative material 16 may be coated, formed, applied or otherwise provided on and/or attached to the electrically conductive tube 12.

The electrically conductive tube 12 may be fabricated, configured and/or formed as or into the plurality of windings 14 by bending. While shown in FIGS. 1A and 1B as including a plurality of segments 18, the electrically conductive tube 12 may alternatively be provided as a continuous or integral piece.

Still referring to FIGS. 1A and 1B, a tubular electrically conductive connector or coupler 20 may be adapted or configured for attachment to an end of the electrically conductive tube 12. As seen in FIG. 1A, the induction coil 10 and/or the plurality of windings 14 may be adapted or configured for assembly with or attachment to ferrite tiles 22 as part of a coil holder or pad. The ferrite tiles 22 may be part of a base pad adapted or configured for attachment to or use in a vehicle charging station (not shown), or a vehicle pad adapted or configured for attachment to or use in an electric vehicle (not shown).

It should be noted that the tubular induction coil 10 is several orders of magnitude stiffer for bending along the x and y-axes of the axis orientations shown in FIGS. 1A and 1B. This makes an entire pad, whether a base pad or vehicle pad, more capable of supporting external loads that the system is designed to withstand. In contrast, in a Litz wire based induction coil design, the coil itself is not capable of carrying external bending loads and all loads therefore must be carried by a housing and/or cover. It should also be noted that while the windings 14 of the induction coil 10 shown in FIGS. 1A and 1B are configured in a plane, such windings 14 may be configured in other shapes as may be desired or required for particular design applications.

The electrically conductive tube 12 and the electrically conductive coupler 20 may be adapted to conduct an alternating current. In that regard, alternating current flow in or through the tube 12 and the plurality of windings 14 generates a magnetic field for wireless inductive charging of the vehicle battery (not shown). The electrically conductive tube 12 and the electrically conductive coupler 20 may each be further adapted or configured for passage of a fluid coolant (not shown) therethrough. In that regard, a coolant flow through the electrically conductive tube 12 acts to transfer heat from the electrically conductive tube 12 generated by alternating current flow in or through the electrically conductive tube 12. It should be noted that for a non-electrically conductive fluid coolant such as air or other heat transfer fluids (not shown), the coolant flowing through the electrically conductive tube 12 may contact an inner surface of the tube 12.

Figure 2A:
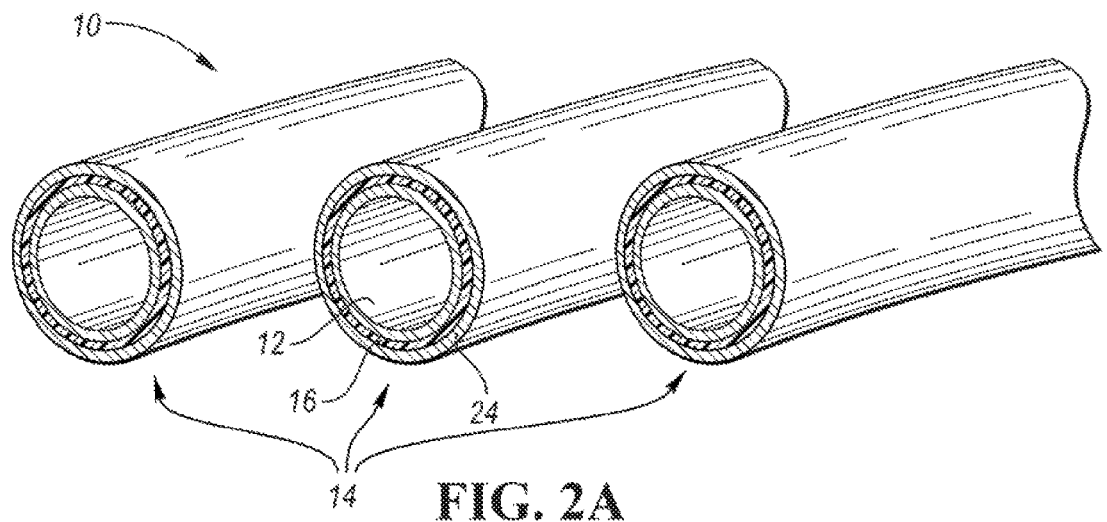
FIG. 2A is a cross-sectional view of an induction coil for wireless charging of a vehicle battery according to one non-limiting exemplary embodiment of the present disclosure.
Figure 2B:
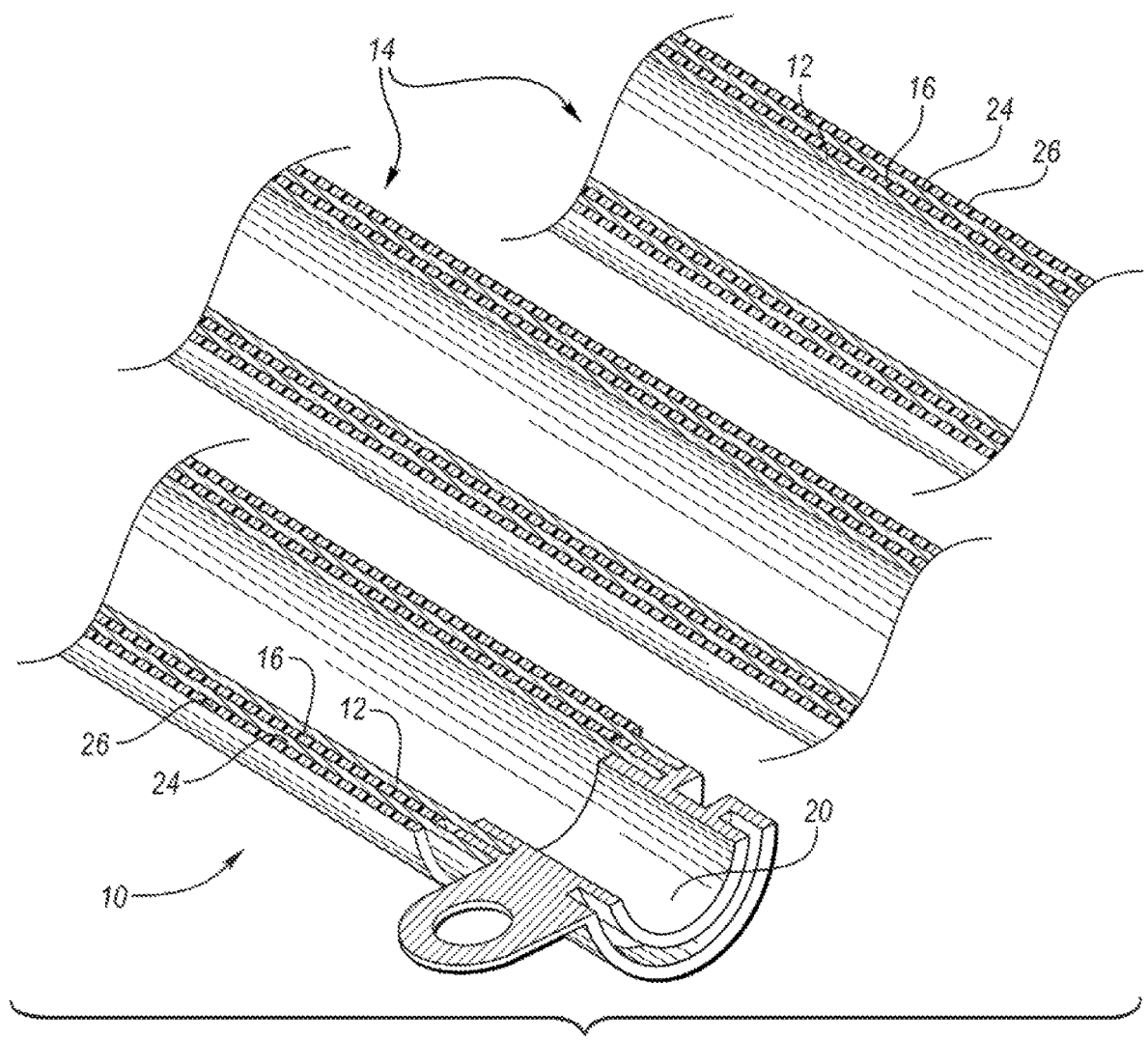
FIG. 2B is a cross-sectional view of an induction coil for wireless charging of a vehicle battery according to another non-limiting exemplary embodiment of the present disclosure.

Referring now to FIGS. 2A and 2B, cross-sectional views are shown of an induction coil 10 for wireless charging of a vehicle battery (not shown) according to non-limiting exemplary embodiments of the present disclosure. More specifically, with reference to the x-y-z right angle coordinate system shown in FIG. 1A, FIG. 2A is a cross-sectional view of an induction coil 10 taken in a y-z plane. Similarly, with reference to the x-y-z right angle coordinate system shown in FIG. 1B, FIG. 2B is a cross-sectional view of an induction coil 10 taken in an x-y plane.

As seen in FIGS. 2A and 2B, the electrically conductive tube 12 forming each of a plurality of windings 14 may have a circular cross-section. It should be noted, however, that the electrically conductive tube 12 may alternatively have a cross-section of any other shape. Once again, electrically insulative material 16 may be provided on an outer surface of the electrically conductive tube 12.

The induction coil 10 may further comprise another electrically conductive tube 24 on an outer surface of the electrically insulative material 16. In that regard, the electrically conductive tube 24 may be concentric and coextensive with the electrically conductive tube 12. Another electrically insulative material 26 may be further provided on an outer surface of the electrically conductive tube 24. In that regard, the electrically insulative material 26 may be coated, formed, applied or otherwise provided on and/or attached to the electrically conductive tube 24. Moreover, the electrically conductive connector or coupler 20 may be further adapted or configured for attachment to an end of the electrically conductive tube 24.

Each of the electrically conductive tubes 12, 24 may have a thickness selected and/or determined based on a selected, desired and/or designed operating frequency of a wireless charging system. As well, each of the electrically conductive tubes 12, 24 may have a wall thickness selected and/or determined based on an electrical resistivity, permittivity, or magnetic permeability of the electrical material of the electrically conductive tubes 12, 24. In one exemplary embodiment, the wall thickness of the electrically conductive tubes 12, 24 may be from 0.1 to 0.5 millimeters, although other dimensions may alternatively be used. In that same regard, the wall thickness of the insulative layers 16, 26 may be from 0.03 to 1.5 millimeters, although other dimensions may alternatively be used. Diameters of circular conductive tubes 12, 24 may range from 3 to 12 millimeters, although other dimensions may alternatively be used. In one exemplary embodiment, the number of conductive tubes provided per coil may be two, although other numbers of conductive tubes may alternatively be used.

The electrically conductive material of the electrically conductive tubes 12, 24 may be aluminum, copper, or any other electrically conductive material. The electrically insulative layers 16, 26 may comprise an insulative material coated, formed, applied or otherwise provided on and/or attached to one or more of the electrically conductive tubes 12, 24. In that regard, the electrically insulative material of the electrically insulative layers 16, 26 may comprises a varnish layer, paint layer, oxide layer, or polymer tape, polymer tube, heat shrink tube, or any other insulative material formed, coated or otherwise provided on one or more of the electrically conductive tubes 12, 24.

Figure 3A:
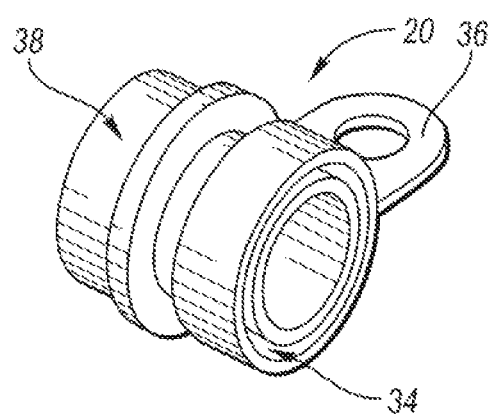
FIG. 3A is a perspective view illustrating an electrically conductive coupler or coupler in an induction coil for wireless charging of a vehicle battery according to one non-limiting exemplary embodiment of the present disclosure.
Figure 3B:
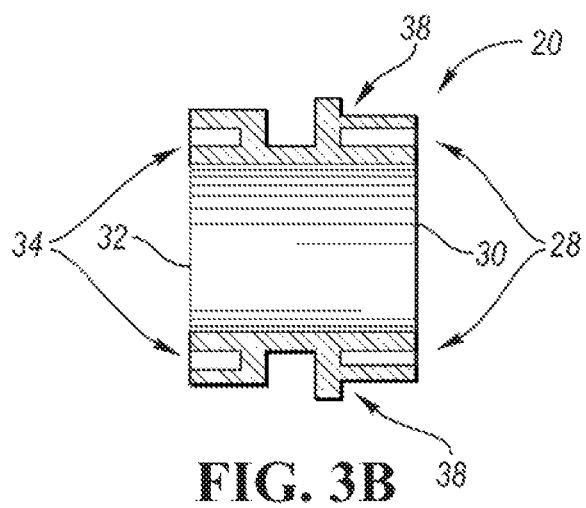
FIG. 3B is a cross-sectional view of an electrically conductive coupler or coupler in an induction coil for wireless charging of a vehicle battery according to one non-limiting exemplary embodiment of the present disclosure.

Referring next to FIGS. 3A and 3B, perspective and cross-sectional views are shown, respectively, of an electrically conductive connector or coupler 20 in an induction coil for wireless charging of a vehicle battery (not shown) according to one non-limiting exemplary embodiment of the present disclosure. As seen therein, the electrically conductive coupler 20 may comprise a ring having an annular feature such as a surface, platform, shoulder, or groove 28 configured to receive an end of the electrically conductive tube 12 (see also FIGS. 2B and 4A).

In that regard, the electrically conductive coupler 20 may have a first end 30 and a second end 32. The first end 30 may have the annular feature such as a surface, platform, shoulder, or groove 28 configured to receive the end of the electrically conductive tube 12. The second end 32 may be adapted or configured for attachment to an end of another tube, conduit or hose (not shown) adapted or configured to supply coolant (not shown) to be passed through the electrically conductive tube 12. In that regard, the second end 32 of the electrically conductive coupler 20 may have another annular feature such as a surface, platform, shoulder, or groove 34 configured to receive the end of the tube, conduit, or hose (not shown) adapted or configured to supply the coolant (not shown). The electrically conductive coupler 20 may be attached to the electrically conductive tube 12 by soldering, welding (e.g., ultrasonically) or any other known technique.

Still referring to FIGS. 3A and 3B, the electrically conductive coupler 20 may also comprise an attachment feature 36 for attachment to an electrical conductor (not shown) for supplying alternating current to one or more of the electrically conductive tubes 12, 24. In that regard, while the attachment feature 36 is shown in FIG. 3A as a ring connection, any type of suitable mechanical-electrical attachment feature may alternatively be used. As well, the electrically conductive tube 24 (see FIG. 2A) may also have a circular cross-section and the electrically conductive coupler 20 comprising a ring may also have an annular feature such as a surface, platform, shoulder, or groove 38 configured to receive an end of the electrically conductive tube 24. In that regard, the electrically conductive coupler 20 may also be attached to the electrically conductive tube 24 by soldering, welding (e.g., ultrasonically) or any other known technique.

Figure 4A:
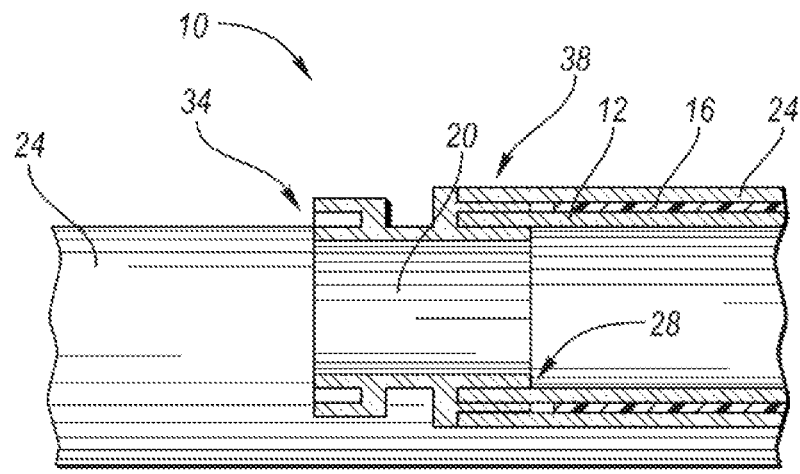
FIG. 4A is a cross-sectional view of an induction coil for wireless charging of a vehicle battery and an electrically conductive coupler according to one non-limiting exemplary embodiment of the present disclosure.
Figure 4B:
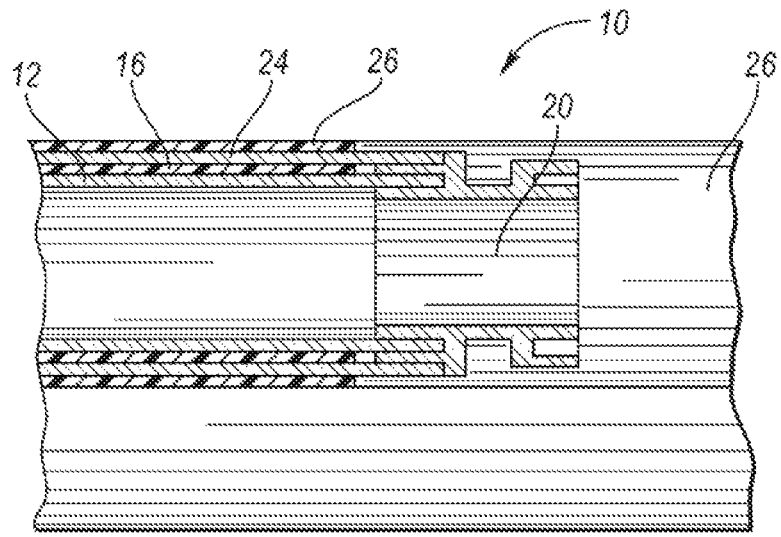
FIG. 4B is a cross-sectional view of an induction coil for wireless charging of a vehicle battery and an electrically conductive coupler according to another non-limiting exemplary embodiment of the present disclosure.

Referring now to FIGS. 4A and 4B, cross-sectional views are shown of an induction coil 10 for wireless charging of a vehicle battery (not shown) and an electrically conductive connector or coupler 20 according to non-limiting exemplary embodiments of the present disclosure. More specifically, with reference to the x-y-z right angle coordinate system shown in FIG. 1A, FIG. 3A is a cross-sectional view of an induction coil 10 taken in an x-z plane. Similarly, with reference to the x-y-z right angle coordinate system shown in FIG. 1B, FIG. 3B is a cross-sectional view of an induction coil 10 taken in an x-z plane.

As seen therein, and with continuing reference to FIGS. 2A and 2B, the induction coil 10 may comprise a first electrically conductive tube 24, and a second electrically conductive tube 12 inside the first electrically conductive tube 24. The first and second electrically conductive tubes 24, 12 may be concentric and coextensive with each other and may be fabricated, configured and/or formed into or as a plurality of windings.

A first electrically insulative material 16 may be provided between the first and second electrically conductive tubes 24, 12. A second electrically insulative material 26 may also be provided on an outer surface of the first electrically conductive tube 24. An electrically conductive connector or coupler 20 may be adapted or configured for attachment to an end of the first electrically conductive tube 24 and to an end of the second electrically conductive tube 12.

The first and second electrically conductive tubes 24, 12 and the electrically conductive coupler 20 may be adapted to conduct an alternating current. In that regard, alternating current flow in or through the first and second electrically conductive tubes 24, 12 and the plurality of windings 14 generates a magnetic field for wireless inductive charging of a vehicle battery (not shown).

The second electrically conductive tube 12 and the electrically conductive coupler 20 are further adapted or configured for passage of a coolant (not shown) therethrough. In that regard, coolant flow through the second electrically conductive tube 12 serves to transfer heat from at least the second electrically conductive tube 12 that is generated by alternating current flow in or through the second electrically conductive tube 12. For a non-electrically conductive fluid coolant such as air or other heat transfer fluids (now shown), the coolant flowing through the electrically conductive tube 12 may contact an inner surface of the tube 12.

The second electrically conductive tube 12 may have a circular cross-section and the electrically conductive coupler 20 may comprises a ring having an annular feature such as a surface, platform, shoulder, or groove 28 configured to receive an end of the second electrically conductive tube 12. The first electrically conductive tube 24 may also have a circular cross-section and the electrically conductive coupler 20 comprising a ring may have an annular feature such as a surface, platform, shoulder, or groove 38 configured to receive an end of the first electrically conductive tube 24.

The electrically conductive coupler 20 may have a first end 30 and a second end 32. The first end 30 of the electrically conductive coupler 20 may have the annular feature such as a surface, platform, shoulder, or groove 28 configured to receive the end of the second electrically conductive tube 12. The second end 32 of the electrically conductive coupler 20 may be adapted or configured for attachment to an end of another conduit, hose, or tube (not shown) adapted or configured to supply the coolant (not shown). In that regard, the second end 32 of the electrically conductive coupler 20 comprising a ring may also have another annular feature such as a surface, platform, shoulder, or groove 34 configured to receive the end of the conduit, hose, or tube adapted or configured to supply the coolant.

Referring next to FIGS. 5A and 5B, cross-sectional views are shown of an induction coil for wireless charging of a vehicle battery and an electrically conductive coupler according to other non-limiting exemplary embodiments of the present disclosure. As seen therein, the tubular structure of the induction coil 10 may comprise an inner electrically conductive tube 12 and an outer electrically conductive tube 24 arranged or configured concentrically. The electrically conductive tubes 12, 24 may be made from copper, aluminum, brass, or any other electrically conductive material. The induction coil 10 may further comprise an electric isolator or electrically insulative tube or material 16 between the adjacent electrically conductive tubes 12, 24. The electrically insulative material 16 may comprise an oxide, varnish, paint, polymeric coating, polymer tube, heat shrink tube, or any other electrically insulative material.

An open or hollow region 40 within the tubular structure of the induction coil 10 permits or allows for the passage of a fluid coolant (not shown) through the induction coil 10. That is, the tubular structure of the induction coil 10 forms a passage 40 that functions or acts as a conduit for a fluid coolant. Coolant flow through the region 40 serves to transfer heat from the electrically conductive tubes 12, 24 that is generated by alternating current flow in or through the electrically conductive tubes 12, 24. In case the coolant (not shown) is electrically conductive (e.g., ordinary water, ethylene glycol-water mixture, or the like), the coolant is electrically isolated from the innermost electrically conductive tube 12 by an electrical isolator or electrically insulative material 42, which again may comprise an oxide, varnish, paint, polymeric coating, or any other electrically insulative material. It should also be noted that tubular structure shown with two electrically conductive tubes 12, 24 is exemplary only, and that the concept can be extended to more electrically conductive tubes and interleaved electrically insulative materials.

As best seen in FIG. 5B, a tubular electrically conductive connector or coupler 20' may be adapted or configured for circumferential attachment to the electrically conductive tubes 12, 24. The electrically conductive tubes 12, 24 may be physically and/or electrically connected to each other at a joint 44 therebetween formed at the end of the electrically conductive tubes 12, 24, such as by soldering, brazing, welding (e.g., ultrasonically) or other known technique. The electrically conductive coupler 20' may also comprise a clamp or attachment feature 36 for attachment to an electrical conductor (not shown) for supplying alternating current to one or more of the electrically conductive tubes 12, 24. The attachment feature 36 may comprise a ring or hole 46 for electrical connection to upstream or downstream circuitry, although any type of suitable mechanical-electrical attachment feature or terminal may alternatively be used. As seen in FIG. 5B, the connection of the tubular electrically conducive coupler 20' to or about the outer surface of the electrically conductive tube 24 enables or allows for the electrically insulative material 42 to extend through an open or hollow inner region of the electrically conductive coupler 20' to thereby also electrically isolate the electrically conductive coupler 20' from an electrically conductive coolant.

As previously noted, in one exemplary embodiment, the wall thickness of the electrically conductive tubes 12, 24 may be from 0.1 to 0.5 millimeters, although other dimensions may alternatively be used. The electrically conductive tubes 12, 24 may be made from copper, aluminum, brass, or any other electrically conductive material. In that same regard, the wall thickness of the insulative layers 16, 42 may be from 0.03 to 1.5 millimeters, although other dimensions may alternatively be used. One or more of the electrically insulative material 16, 42 may comprise an oxide, varnish, paint, polymeric coating, polymer tube, heat shrink tube, or any other electrically insulative material. Diameters of circular conductive tubes 12, 24 may range from 3 mm to 12 mm, although other dimensions may alternatively be used. Once again, in one exemplary embodiment, the number of conductive tubes provided per coil may be two, although other numbers of conductive tubes may alternatively be used. In another exemplary embodiment, the electrically insulative material 16 in-between the electrically conductive tubes 12, 24 may be an electrically insulative fluid, such as air, that flows through the space (which may be annular) between the electrically conductive tubes 12, 24 and acts as a coolant to provide the function of removing heat from both electrically conductive tubes 12, 24 and also provides the function of electrical isolation between adjacent electrically conductive concentric tubes 12, 24.

Referring now to FIG. 6, a flowchart of a method 50 of manufacturing an induction coil 10 for wireless charging of a vehicle battery according to another non-limiting exemplary embodiment of the present disclosure is shown. As seen therein, and with continuing reference to FIGS. 1A-4B, the method 50 may comprise forming 52 a first electrically conductive tube 12, a second electrically conductive tube 24, and an electrically insulative material 16 into a concentric tube structure, wherein the second electrically conductive tube 12 is inside the first electrically conductive tube 24, and wherein the electrically insulative material 16 is between the first 12 and second 24 electrically conductive tubes and electrically isolates the first electrically conductive tube 12 from the second electrically conductive tube 24. In that regard, it should be noted that the second electrically conductive tube 24 may be coextensive with the first electrically conductive tube 12 throughout the plurality of windings 14. The first 12 and second 24 electrically conductive tubes and the electrically insulative material 16 may be formed individually or together in any combination(s) by any known type of manufacturing process, such as for example extrusion.

The method 50 may further comprise bending 54 the concentric tube structure to form a plurality of windings 14, wherein the first 12 and second 24 electrically conductive tubes are adapted to conduct an alternating current, wherein alternating current flow in or through the first 12 and second 24 electrically conductive tubes and the plurality of windings 14 generates a magnetic field for wireless inductive charging of the vehicle battery, wherein the concentric tube structure is configured for passage of a coolant therethrough, and wherein a coolant flow through the tube structure transfers heat from at least the second electrically conductive tube 24 generated by alternating current flow in or through the second electrically conductive tube 24. The method 50 may still further comprise attaching 56 an electrically conductive coupler 20 to the concentric tube structure, the electrically conductive coupler 20 comprising an attachment feature for attachment to an electrical conductor. The electrically conductive coupler 20 may be configured for passage of the coolant therethrough. The electrically conductive coupler 20 may also be configured for attachment to another tube adapted to supply the coolant.

The present disclosure thus describes a tubular induction coil 10 and method 50 of manufacturing a tubular induction coil 10 having lower material cost than Litz wire based induction coils. In that regard, the tubular material cost is lower than the Litz wire used in the current induction coil designs. Moreover, the manual or semi-automated coil winding required in Litz wire based systems is replaced by a tube extrusion and/or bending process. As well, the tubular coil of the induction coil 10 described herein may be prefabricated and introduced as a simple drop-in part in the wireless charger assembly process wherein the coil assembly may dropped in the coil holder of a base pad or vehicle pad. As a result, the induction coil design 10 of the present disclosure is simpler and cheaper than Litz wire based designs, as the tubular induction coil 10 need not meet Litz wire constraints.

Still further, the tubular induction coil 10 of the present disclosure allows for a large increase in the magnitude of wireless power transfer for battery charging and other applications. In that regard, the performance of the tubular induction coil 10 is better than Litz wire based induction coils as a result of a lower equivalent resistance for the same cross sectional area occupied by the coil. The Joule losses in the tubular induction coil 10 of the present disclosure are lower under identical conditions and hence efficiency is better, thereby enabling transfer charging of traction batteries in less time compared to Litz wire based induction coils.

Furthermore, for a given performance and coil material, the size and weight of the tubular induction coil 10 of the present disclosure is also smaller and lower compared to that of a Litz wire induction coil. In that regard, the tubular induction coil 10 of the present disclosure allows for the use of aluminum as the construction material, which results in 40% to 50% weight savings compared to a copper Litz wire based induction coil. The lighter induction coil 10 of the present disclosure also results in smaller weight of the vehicle pad, thereby reducing the weight of the vehicle and resulting in improved vehicle efficiency.

As is readily apparent from the foregoing, various non-limiting embodiments of an induction coil and a method of manufacturing an induction coil for wireless charging of a vehicle battery have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. An induction coil for wireless charging of a vehicle battery, the induction coil comprising:
   an electrically conductive tube configured as a plurality of windings; and
   an electrically conductive coupler configured for attachment to the electrically conductive tube;
   wherein the electrically conductive tube and the electrically conductive coupler are to conduct an alternating current, wherein alternating current flow in the tube and the plurality of windings generates a magnetic field for wireless inductive charging of the vehicle battery; and
   wherein the electrically conductive tube and the electrically conductive coupler are each configured for passage of a coolant therethrough, wherein a coolant flow through the electrically conductive tube transfers heat from the electrically conductive tube generated by alternating current flow through the electrically conductive tube.

2. The induction coil of claim 1 further comprising an electrically insulative material on an outer surface of the electrically conductive tube.

3. The induction coil of claim 2 further comprising another electrically conductive tube on an outer surface of the electrically insulative material, wherein the electrically conductive coupler is further configured for attachment to the another electrically conductive tube.

4. The induction coil of claim 3 further comprising another electrically insulative material on an inner surface of the electrically conductive tube.

5. The induction coil of claim 3 wherein the electrically insulative material comprises an oxide, varnish, paint, polymeric coating, polymer tube, heat shrink tube, or an electrically insulative fluid.

6. The induction coil of claim 3 wherein the electrically conductive tube, the electrically insulative material, and the another electrically conductive tube have a circular cross-section and the electrically conductive coupler comprises a ring having a first annular feature configured to receive an end of the electrically conductive tube and a second annular feature configured to receive an end of the another electrically conductive tube.

7. The induction coil of claim 6 wherein the electrically conductive coupler comprises a first end and a second end, the first end having the first and second annular features, and the second end configured for attachment to an another tube configured to supply the coolant.

8. The induction coil of claim 7 wherein the second end of the electrically conductive coupler comprises a third annular feature configured to receive an end of the another tube configured to supply the coolant.

9. The induction coil of claim 1 wherein the electrically conductive coupler comprises an attachment feature for attachment to an electrical conductor.

10. The induction coil of claim 1 wherein the plurality of windings is configured in a plane.

11. The induction coil of claim 1 wherein the plurality of windings is configured for assembly with a pad configured for attachment to a vehicle or a charging station.

12. An induction coil for wireless charging of a vehicle battery, the induction coil comprising:
    a first electrically conductive tube;
    a second electrically conductive tube inside the first electrically conductive tube and coextensive therewith, wherein the first and second electrically conductive tubes are configured as a plurality of windings;
    a first electrically insulative material between the first and second electrically conductive tubes; and
    an electrically conductive coupler configured for attachment to the first electrically conductive tube, wherein the electrically conductive coupler comprises an attachment feature for attachment to an electrical conductor;
    wherein the first and second electrically conductive tubes and the electrically conductive coupler are to conduct an alternating current, wherein alternating current flow in the first and second electrically conductive tubes and the plurality of windings generates a magnetic field for wireless inductive charging of the vehicle battery; and
wherein the second electrically conductive tube is configured for passage of a coolant therethrough, wherein a coolant flow through the second electrically conductive tube transfers heat from at least the second electrically conductive tube generated by alternating current flow through the second electrically conductive tube.

13. The induction coil of claim 12 further comprising a second electrically insulative material on an inner surface of the second electrically conductive tube.

14. The induction coil of claim 12 wherein the first electrically conductive tube, the first electrically insulative material, and the second electrically conductive tube have a circular cross-section and the electrically conductive coupler comprises a ring having a first annular feature configured to receive an end of the first electrically conductive tube and a second annular feature configured to receive an end of the second electrically conductive tube.

15. The induction coil of claim 14 wherein the electrically conductive coupler has a first end and a second end, the first end comprising the first and second annular features, and the second end configured for attachment to an end of another tube configured to supply the coolant.

16. The induction coil of claim 15 wherein the second end of the electrically conductive coupler comprises a third annular feature configured to receive the end of the another tube configured to supply the coolant.

17. The induction coil of claim 12 wherein the plurality of windings is configured for assembly with a pad configured for attachment to a vehicle or a charging station.

18. The induction coil of claim 12 wherein the first and second electrically conductive tubes are configured as the plurality of windings by bending the first and second electrically conductive tubes.

19. A method of manufacturing an induction coil for wireless charging of a vehicle battery, the method comprising:
forming a first electrically conductive tube, a second electrically conductive tube, and an electrically insulative material into a concentric tube structure, wherein the second electrically conductive tube is inside the first electrically conductive tube, and wherein the first electrically insulative material is between the first and second electrically conductive tubes and electrically isolates the first electrically conductive tube from the second electrically conductive tube; and
bending the concentric tube structure to form a plurality of windings, wherein the first and second electrically conductive tubes are to conduct an alternating current, wherein alternating current flow in the first and second electrically conductive tubes and the plurality of windings generates a magnetic field for wireless inductive charging of the vehicle battery, wherein the concentric tube structure is configured for passage of a coolant therethrough, and wherein a coolant flow through the tube structure transfers heat from at least the second electrically conductive tube generated by alternating current flow in the second electrically conductive tube.

20. The method of claim 19 further comprising attaching an electrically conductive coupler to the concentric tube structure, the electrically conductive coupler comprising an attachment feature for attachment to an electrical conductor.

* * * * *